(No Model.)

G. B. N. TOWER.
ORE FURNACE.

No. 293,378.   Patented Feb. 12, 1884.

5 Sheets—Sheet 1.

WITNESSES
Fred. G. Dieterich.
P. C. Dieterich.

INVENTOR
George B. N. Tower
by
DeWitt C. Allen, Attorney

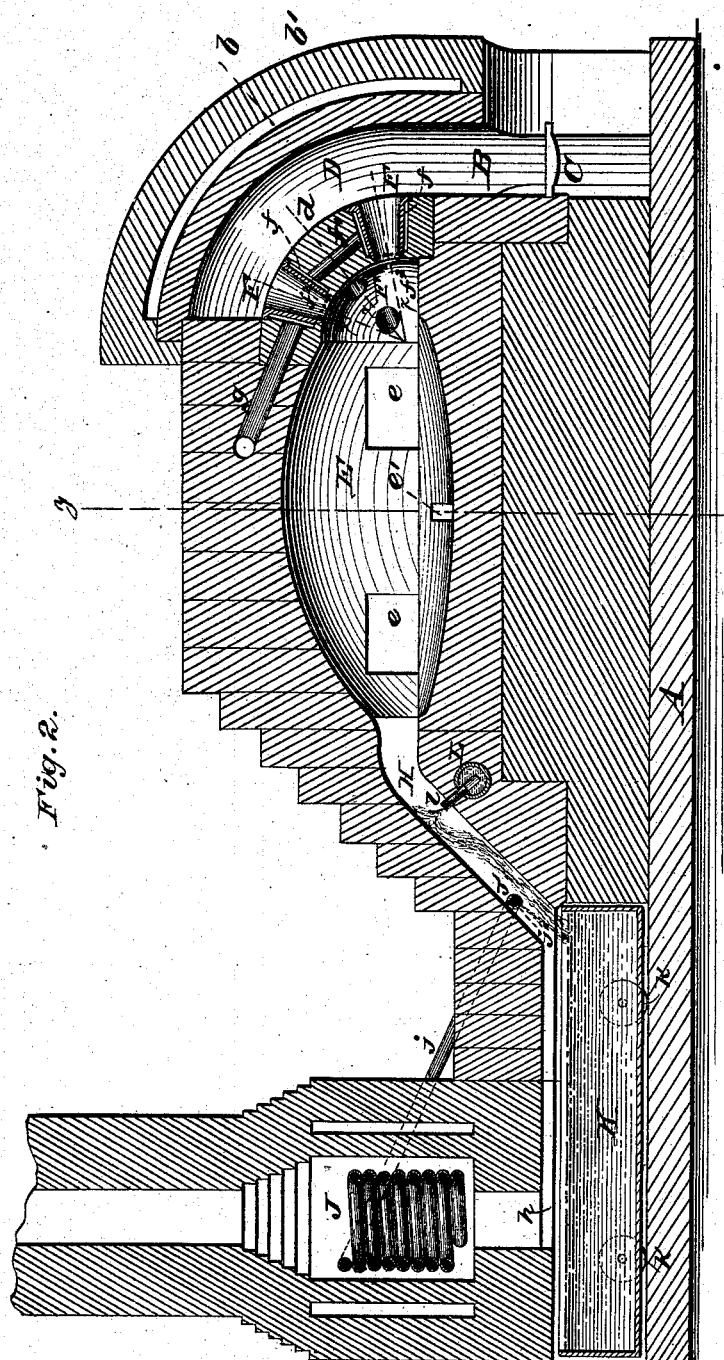

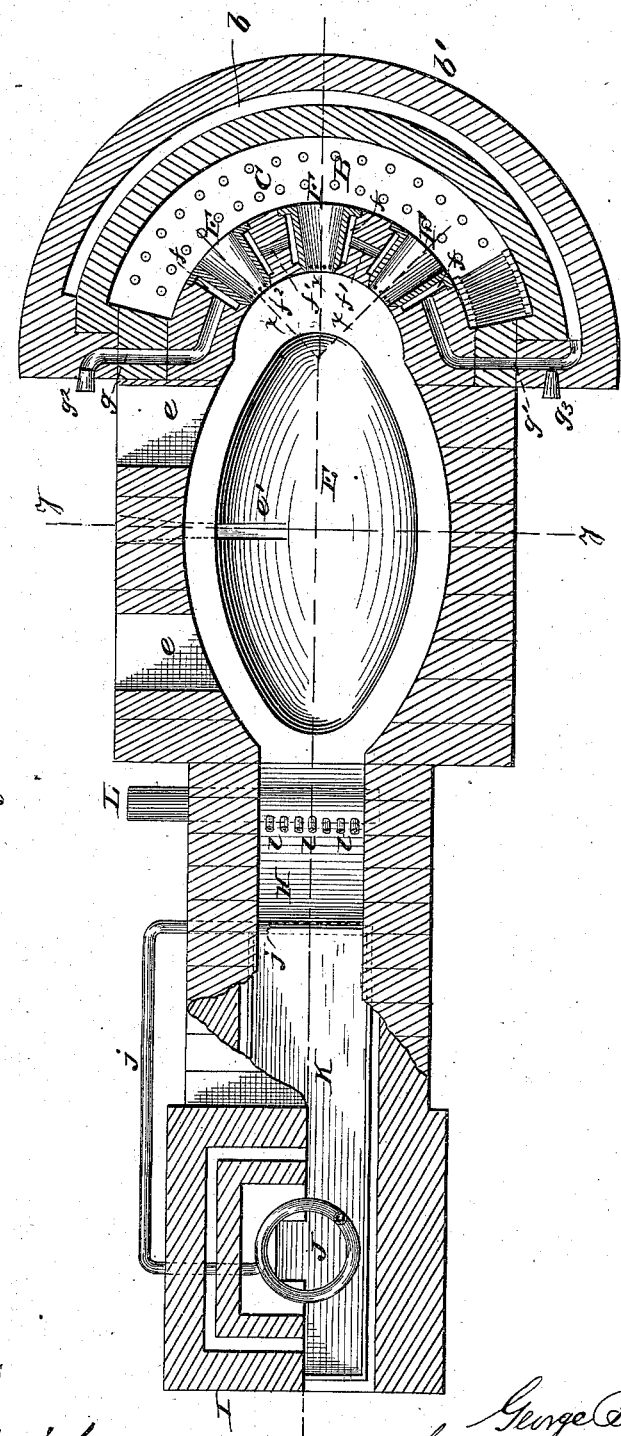

(No Model.)  
5 Sheets—Sheet 4.
G. B. N. TOWER.
ORE FURNACE.
No. 293,378. Patented Feb. 12, 1884.
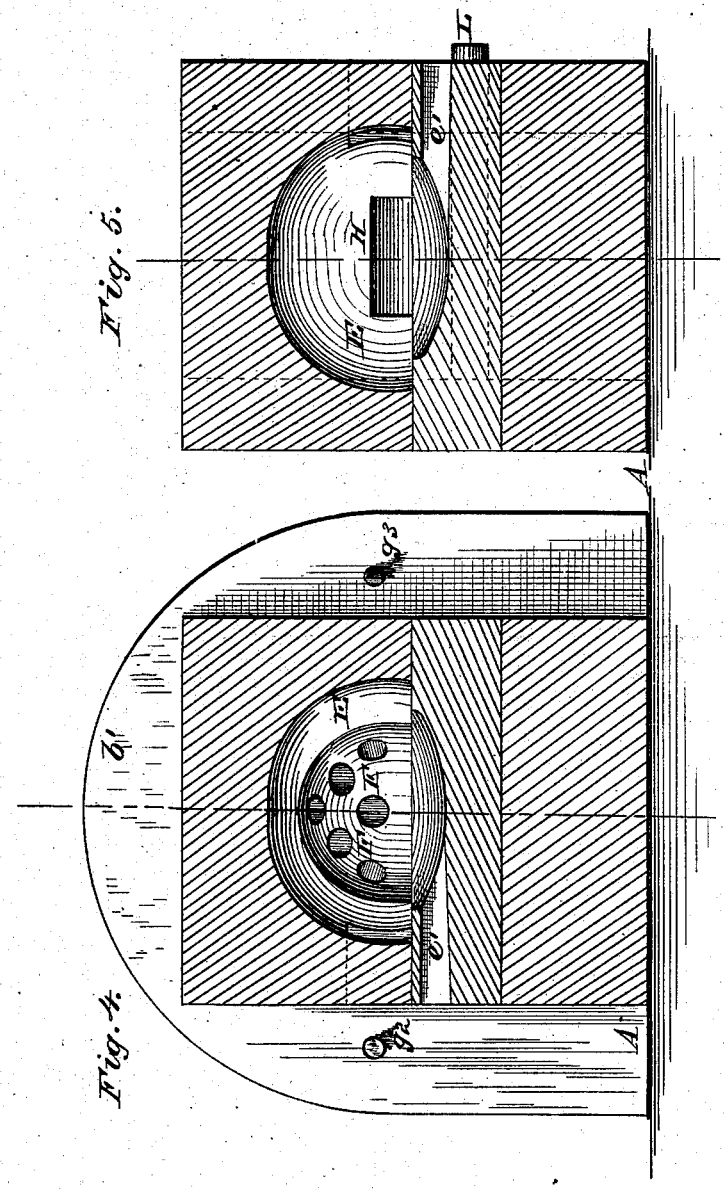
WITNESSES  
Fred. G. Dieterich.  
F. C. Dieterich.
INVENTOR  
George B. N. Tower.  
by DeWitt C. Allen Attorney (No Model.)

G. B. N. TOWER.
ORE FURNACE.

No. 293,378. Patented Feb. 12, 1884.

Witnesses:
P. C. Dietrich
Fred. G. Dieterich

Inventor:
George B. N. Tower
by
DeWitt C. Allen
Atty.

UNITED STATES PATENT OFFICE.

GEORGE B. N. TOWER, OF NEW YORK, N. Y., ASSIGNOR OF ONE-HALF TO EDWARD L. LAMBIE, OF WASHINGTON, DISTRICT OF COLUMBIA.

ORE-FURNACE.

SPECIFICATION forming part of Letters Patent No. 293,378, dated February 12, 1884.

Application filed February 14, 1882. (No model.)

*To all whom it may concern:*

Be it known that I, GEORGE B. N. TOWER, a citizen of the United States, residing at New York city, in the county of New York and State of New York, have invented certain new and useful Improvements in Ore and other Furnaces; and I do hereby declare the following to be a full, clear, and exact description of the invention, such as will enable others skilled in the art to which it appertains to make and use the same.

This invention relates to certain new and useful improvements in the class of furnaces for smelting ores and apparatus for condensing fumes; and the objects of the invention are to produce an increased and intense heat, in connection with an excess of air, to facilitate oxidation, and also for preventing the escape of any volatilized mineral particles from the furnace; and to this end the invention consists, essentially, in means for subjecting the ore in the smelting-furnace to the combined action of a series of jets of combustible gases from the fire-place, that are made to commingle with highly-heated air, by which said jets, as they pass into the smelting-furnace, are made to take a whirling or revolving course, and passing to a common center on account of the arrangement of tuyeres, and where the heat is greatest, which mixture, igniting, produces a better hot-blast and more intense heat directly on the ores.

The invention consists, further, in novel means for condensing all the metallic vapors and fumes which escape from the smelting-furnace, all as will be hereinafter fully described, and set forth in the claims hereto annexed.

Figure 1:
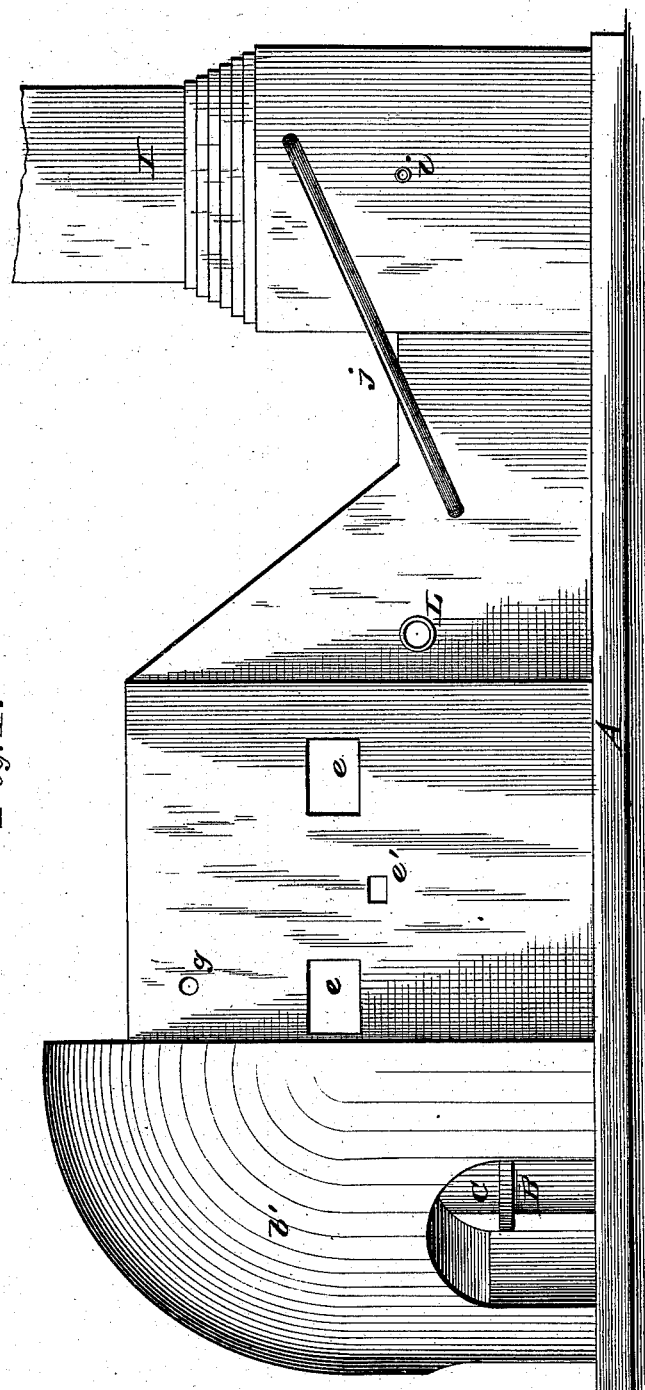
Figure 6:
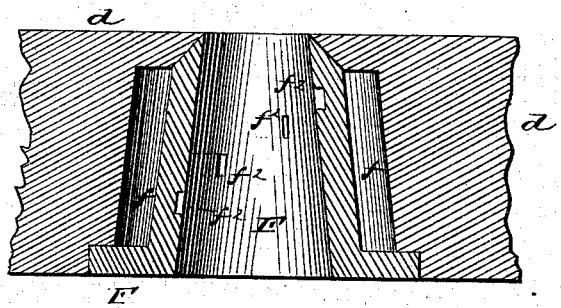
Figure 7:
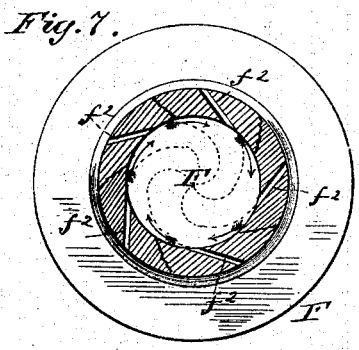
Figure 8:
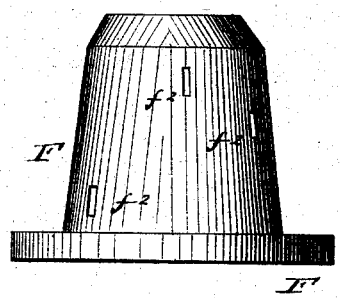

Referring to the accompanying drawings, which form a part of this specification, Figure 1 represents a side elevation; Fig. 2, a longitudinal vertical central section; Fig. 3, a longitudinal horizontal central section; Fig. 4, a transverse section through the smelting-chamber on the line $y\,y$ of Figs. 2 or 3, looking toward the front end thereof; Fig. 5, a similar view, looking toward the rear end of the furnace. Fig. 6 is a central section through one of the tuyeres leading to the smelting-chamber, showing an air-space around it in the bridge-wall of the furnace; Fig. 7, an end view of the same; Fig. 8, detached side view of one of the tuyeres.

Like letters of reference indicate like parts in all the figures of the drawings.

In the drawings, A represents the base upon which the furnace and apparatus are erected.

B represents a segmental fire-place, and C a similar formed grate arranged therein, at the front end of the furnace; and D, the combustion-flue of the fire-place, extending upward and over the front bridge-wall, $d$, of the smelting-chamber, and of semicircular and arch-shaped form, as shown in Figs. 2 and 3.

$b$ represents a semicircular air-space arranged in the front wall, $b'$, of the furnace, for a purpose to be hereinafter described, the inner wall and air-space conforming to the shape of the flue D.

E represents the smelting-chamber, and $e\,e$ suitable openings through the side wall thereof for charging the chamber with the ore, which openings are to be closed air or gas tight by suitable doors; and $e'$ is the usual tap-hole for drawing off the smelted ores.

F represents a series of tuyeres extending through the arch shaped front bridge-wall, $d$, of the furnace, for conducting the hot-blast and gases and products of combustion from the fire-place to the smelting-furnace; and $f$, air-spaces formed in the bridge-wall $d$ around said tapering flues, and connected together by pipes $f'$, which air-spaces may be supplied with cold or outside air through pipe $g$, or hot air through pipe $g'$ from the hot-air space $b$, as more clearly shown in Fig. 3, which pipes $g\,g'$ are provided with plugs $g^2\,g^3$ or other suitable means to regulate or stop the flow of air through them to the air-space $f$, surrounding the tapering flues.

$f^2$ represents openings through the tuyere F, communicating with the air-space $f$, surrounding them, said openings $f^2$ being arranged spirally around the flues, as shown in Fig. 6, and through the same, so as to discharge the air therein obliquely to the axis of the tuyeres, thus causing the air and gases passing through the tuyeres to take a whirling direction, as shown by the arrows in Fig. 7, which intimately mixes them, and the mixture, being ignited as it is discharged into the smelting-chamber from the several tuyeres, continues its revolving or whirling course from all the flues toward the point indicated by the dotted lines $x$, Figs. 2 and 3, thus producing and discharging upon the ores in the furnace a very strong hot-blast, causing an intense heat that quickly and thoroughly reduces the ore.

Leading from the rear of the furnace E is a downwardly-inclined flue, H, having a horizontal flue, $h$, communicating with the lower end of the uptake or stack I, which is provided in the lower portion thereof with a coiled pipe, J, that is generally kept filled to nearly the upper end thereof with water admitted from pipe $i$, projecting through wall of furnace, as shown in Fig. 1, and which pipe is to be connected with any suitable reservoir, for the purpose of generating steam in said coiled pipe J from the heat of the products of combustion passing up through the uptake or stack I.

K represents a water-vessel arranged on wheels or rollers $k$, adapted to be moved in and out from under the uptake or stack and into the flue H, communicating therewith.

L represents a water-pipe connected in any suitable manner to a reservoir, (not shown,) and which pipe is arranged transversely through the furnace-walls, and has a series of small pipes, $l$, discharging into the flue H from its lower side and nearest the opening communicating with the furnace, which pipes $l$ are so arranged as to discharge the water in jets into the flue H, and through the products of combustion and metallic vapors or fumes passing through the same from the smelting-chamber, which jets of water, striking against the upper inclined wall of the flue, are carried down in a thin sheet through the products of combustion and metallic fumes or vapors, and flow off into the vessel K. The "wet" steam (in contradistinction to superheated steam) generated in the coiled pipe J in the lower portion of the uptake or stack I, is carried through pipe $j$ into a transverse pipe, $j'$, which passes through the lower portion of the inclined flue H, near the upper wall thereof, which pipe $j'$ in said flue is provided with a longitudinal slit or series of openings, $j^2$, through the lower side thereof, so as to discharge the steam in a thin stream, and at such an angle as will force the metallic vapors or fumes in the passing products of combustion down directly into the water-vessel K, near the front end thereof, as clearly shown in Fig. 2.

By the above-described water and steam jets acting on the products of combustion as they pass through the flue H, all the condensable matters contained therein are eliminated in their passage through said flue and collected in the water in vessel K, while the water-jets, acting on or against the upper wall of the flue H, tend to keep it cool and unobstructed. The discharging water and steam in flue H, in connection with the arrangement before described of mixing and discharging the combustible gases and heated air into the furnace, will produce the necessary vacuum to cause a draft through the fire-place and furnace, which can be controlled by any of the ordinary means employed in furnaces. The character and quality of the condensed products will of course depend on the character of the ore charged into the smelting-chamber, and as said chamber and all other parts of the apparatus are made gas-tight, leakage or loss of any metallic vapors or fumes is obviated, and the solid particles condensed and collected into said water-vessel K, from which they may be subsequently separated by any of the well-known amalgamating methods or processes.

In order to adapt the furnace to the intense hot-blast and heat produced by the before-described means, it may be lined with asbestus.

The reservoir for supplying water to the coiled pipe J should have means for regulating the height of water in said pipe, whereby the steam may be made more or less wet, as deemed expedient, by respectively increasing or decreasing the height of water in said pipe; and the reservoir for supplying the pipe L should be arranged so as to give the necessary head to throw or force the water through the jet-pipes $l$ against the upper wall of the flue H.

Any of the well-known materials—such as coke, wood, or coal—may be used for furnishing the flame-blast and combustible gases to be discharged into the smelting-chamber from the fire-place B, and, also, any of the well-known oils—such as petroleum, &c.—may be used, if desired, by changing the construction of fire-place to adapt it for that purpose.

All metallic ores of every description which are capable of being melted to a fluid slag, either by themselves or by mixing one or more with others, or by the aid of suitable fluxes, may be smelted.

Further description of the operation of my improved furnace and condensing apparatus is deemed unnecessary, it being obvious from the foregoing.

I am aware that furnaces having means for discharging air in connection with combustible gases into the smelting-chamber, also the introduction into the neck of a furnace of a jet or jets of steam, are old, and such I do not wish to be understood as claiming, broadly, as of my invention.

I am aware that a tile or casting composed of an inner and outer shell, forming an air-chamber between them, one of which is provided with recesses and the other with corresponding projections to fit therein, the inner shell having oblique apertures, whereby the air and gases are made to take a whirling or revolving course while passing through the flue, was patented to me May 16, 1882, and numbered 257,905, and I do not wish to be understood as claiming, broadly, in the present case anything shown, described, or claimed in said patent.

Having thus fully described my invention, what I claim as new, and desire to secure by Letters Patent, is—

1. The tapering tuyeres F, having connecting openings through them, arranged in a spiral manner, and discharging therein obliquely to their axes, in combination with the bridge-wall of a furnace having air-spaces surrounding said tuyeres for admitting air thereto, substantially as and for the purpose specified.

2. The combination, with a smelting-chamber and fire-place, B, of a series of intermediate tuyeres, constructed as described, to convey the gases and air toward a common center in said chamber, and having openings for admitting air therein, said openings being arranged through the tuyeres obliquely to their axes, the bridge-wall through which said tuyeres pass having air-spaces $f$ surrounding said tuyeres, and wall $b'$, having air-space $b$ and connecting-flues $f'$, and supply-pipe $g'$, substantially as and for the purpose specified.

3. The combination, with the discharge-flue H of the smelting-chamber E, of the water-pipe L, arranged through the furnace-walls below said flue, and having discharge-pipes $l$, for admitting jets of water to said flue against its upper inclined wall, substantially as and for the purpose specified.

4. The combination, with the inclined discharge-flue H of the smelting-chamber E, of the water-pipe L, and jet-pipes $l$, and steam-pipe $j$, having jet-pipe $j'$, all arranged to discharge water and steam into said flue, substantially in the manner and for the purpose specified.

5. The combination, with the smelting-chamber E, flue H, stack I, vessel K, for containing water, and coiled pipe J, of the pipe $j$, having jet-pipe $j'$, for supplying the steam to the interior or neck of said flue, and water-pipe L, and jet-pipe $l$, for discharging water therein, substantially as described.

In testimony whereof I affix my signature in presence of two witnesses.

GEORGE B. N. TOWER.

Witnesses:
E. L. LAMBIE,
JAS. S. CHALKER.